US012211509B2

United States Patent
Zhang et al.

(10) Patent No.: US 12,211,509 B2
(45) Date of Patent: Jan. 28, 2025

(54) FUSION OF ACOUSTIC AND TEXT REPRESENTATIONS IN RNN-T

(71) Applicant: Google LLC, Mountain View, CA (US)

(72) Inventors: Chao Zhang, Mountain View, CA (US); Bo Li, Fremont, CA (US); Zhiyun Lu, Brooklyn, NY (US); Tara N. Sainath, Jersey City, NJ (US); Shuo-yiin Chang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 17/821,160

(22) Filed: Aug. 19, 2022

(65) Prior Publication Data

US 2023/0107695 A1  Apr. 6, 2023

Related U.S. Application Data

(60) Provisional application No. 63/262,184, filed on Oct. 6, 2021.

(51) Int. Cl.
*G10L 15/30*  (2013.01)
*G06N 7/01*  (2023.01)

(52) U.S. Cl.
CPC ............. *G10L 15/30* (2013.01); *G06N 7/01* (2023.01)

(58) Field of Classification Search
CPC ....... G10L 15/30; G10L 15/063; G10L 15/16; G10L 2015/0635; G06N 7/01; G06N 3/0442; G06N 3/0455
USPC ........................................................ 704/270
See application file for complete search history.

(56) References Cited

U.S. PATENT DOCUMENTS

| | | | |
|---|---|---|---|
| 10,346,969 B1 * | 7/2019 | Raghu | G06N 3/08 |
| 10,878,808 B1 * | 12/2020 | Mathias | G10L 15/22 |
| 11,315,548 B1 * | 4/2022 | Heikinheimo | G10L 15/065 |

(Continued)

FOREIGN PATENT DOCUMENTS

WO  2021006920 A1  1/2021

OTHER PUBLICATIONS

International Search Report and Written Opinion related to Application No. PCT/US2022/075242, dated Nov. 21, 2022.

(Continued)

*Primary Examiner* — Thuykhanh Le
(74) *Attorney, Agent, or Firm* — Honigman LLP; Brett A. Krueger; Grant Griffith

(57) ABSTRACT

A speech recognition model includes an encoder network, a prediction network, and a joint network. The encoder network is configured to receive a sequence of acoustic frames characterizing an input utterance; and generate, at each of a plurality of output steps, a higher order feature representation for a corresponding acoustic frame in the sequence of acoustic frames. The prediction network is configured to: receive a sequence of non-blank symbols output by a final Softmax layer; and generate, at each of the plurality of output steps, a dense representation. The joint network is configured to generate, at each of the plurality of output steps based on the higher order feature representation and the dense representation, a probability distribution over possible speech recognition hypotheses. The joint network includes a stack of gating and bilinear pooling to fuse the dense representation and the higher order feature representation.

20 Claims, 5 Drawing Sheets

(56) References Cited

U.S. PATENT DOCUMENTS

| | | | |
|---|---|---|---|
| 11,741,946 B2* | 8/2023 | Saon | G06N 3/045 |
| | | | 704/231 |
| 2019/0073560 A1* | 3/2019 | Matei | G06N 3/08 |
| 2019/0340469 A1* | 11/2019 | Su | G06N 3/08 |
| 2019/0361994 A1* | 11/2019 | Shen | G06F 16/51 |
| 2020/0380215 A1* | 12/2020 | Kannan | G10L 15/005 |
| 2021/0104223 A1* | 4/2021 | Beaufays | G10L 15/063 |
| 2021/0280170 A1* | 9/2021 | Chen | G06N 3/088 |
| 2022/0093083 A1* | 3/2022 | Kurata | G06N 3/047 |
| 2022/0122589 A1* | 4/2022 | Sharifi | G10L 15/22 |
| 2022/0122622 A1* | 4/2022 | Narayanan | G10L 15/16 |
| 2022/0139380 A1* | 5/2022 | Meng | G06N 3/044 |
| | | | 704/232 |
| 2022/0208179 A1* | 6/2022 | Kurata | G10L 25/30 |
| 2022/0277734 A1* | 9/2022 | Saon | G06N 3/045 |
| 2022/0310061 A1* | 9/2022 | Ramabhadran | G06N 3/045 |
| 2022/0310071 A1* | 9/2022 | Botros | G06N 3/045 |
| 2022/0310074 A1* | 9/2022 | Audhkhasi | G06N 3/0455 |
| 2022/0310080 A1* | 9/2022 | Qiu | G10L 15/02 |
| 2022/0310097 A1* | 9/2022 | Kim | G10L 15/063 |
| 2023/0069628 A1* | 3/2023 | Nagano | G06N 3/044 |
| 2023/0074869 A1* | 3/2023 | Sun | G10L 15/08 |
| 2023/0089308 A1* | 3/2023 | Wang | G10L 21/0272 |
| | | | 704/232 |
| 2023/0096805 A1* | 3/2023 | Kim | G10L 15/1815 |
| | | | 704/232 |
| 2023/0104244 A1* | 4/2023 | Kurata | G06N 3/044 |
| | | | 704/232 |
| 2023/0109407 A1* | 4/2023 | Hu | G06N 3/0455 |
| | | | 704/232 |
| 2023/0130634 A1* | 4/2023 | Sainath | G10L 15/16 |
| | | | 704/232 |
| 2024/0152696 A1* | 5/2024 | Anand | G06Q 10/067 |

OTHER PUBLICATIONS

Venkatesh Ganesh et al: "Memory-Efficient Speech Recognition on Smart Devices", ICASSP 2021—2021 IEEE International Conference on Acoustics, Speech and Signal Processing (ICASSP), IEEE, Jun. 6, 2021 (Jun. 6, 2021), pp. 8368-8372, XP033954749, DOI: 10.1109/ICASSP39728.2021.9414502 [retrieved on Apr. 22, 2021] paragraph 2 figure 2.

Bin Wang et al: "Attention-based Transducer for Online Speech Recognition", arxiv.org <http://arxiv.org>, Cornell University Library, 201 Olin Library Cornell University Ithaca, NY 14853, May 18, 2020 (May 20, 2020), XP081671732, the whole document.

* cited by examiner

FUSION OF ACOUSTIC AND TEXT REPRESENTATIONS IN RNN-T

CROSS REFERENCE TO RELATED APPLICATIONS

This U.S. Patent Application claims priority under 35 U.S.C. § 119(e) to U.S. Provisional Application 63/262,184, filed on Oct. 6, 2021. The disclosure of this prior application is considered part of the disclosure of this application and is hereby incorporated herein by reference in its entirety.

TECHNICAL FIELD

This disclosure relates generally to recurrent neural network transducer (RNN-T) models and, more particularly, to improving the fusing of acoustic and text representations in an RNN-T model.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides an automated speech recognition (ASR) model including an encoder network, a prediction network, and a joint network. The encoder network is configured to receive, as first input, a sequence of acoustic frames characterizing an input utterance; and generate, at each of a plurality of output steps, a higher order feature representation for a corresponding acoustic frame in the sequence of acoustic frames. The prediction network is configured to receive, as second input, a sequence of non-blank symbols output by a final Softmax layer; and generate, at each of the plurality of output steps, a dense representation. The joint network is configured to receive, as third input, the dense representation generated by the prediction network at each of the plurality of output steps and the higher order feature representation generated by the audio encoder at each of the plurality of output steps, and generate, at each of the plurality of output steps, a probability distribution over possible speech recognition hypotheses. The joint network includes a combination structure that stacks gating and bilinear pooling to fuse the dense representation generated by the prediction network and the higher order feature representation generated by the audio encoder.

Implementations of the disclosure may include one or more of the following optional features. In some implementations, a regularization method is applied to the prediction network during training by recomputing the dense representation using a scaling factor and a stop gradient function having an input tensor with zero gradients. In some examples, the joint network is not a fully connected layer.

In some implementations, the audio encoder includes a stack of self-attention blocks. In these implementations, the stack of self-attention blocks may include a stack of conformer blocks, or a stack of transformer blocks. In some examples, the stack of conformer blocks includes a stack of 12 encoder blocks having 8-head self-attention.

In some implementations, the prediction network includes a long short-term memory (LSTM)-based prediction network. Alternatively, the prediction network may include a V2 embedding look-up table. In some examples, the prediction network includes a stateless prediction network.

Another aspect of the disclosure provides a computer-implemented method that, when executed on data processing hardware, causes the data processing hardware to perform operations. The operations including receiving a sequence of acoustic frames characterizing an input utterance. The operations further including, at each of a plurality of time steps generating, by an audio encoder of a speech recognition model, a higher order feature representation for a corresponding acoustic frame in the sequence of acoustic frames, and generating, by a prediction network of the speech recognition model, a dense representation for a corresponding sequence of non-blank symbols output by a final Softmax layer of the speech recognition model. The operations at each of the plurality of time steps further include generating, by a joint network of the speech recognition model that receives the higher order feature representation generated by the audio encoder and the dense representation generated by the prediction network, a probability distribution over possible speech recognition hypotheses. The joint network includes a combination structure that stacks gating and bilinear pooling to fuse the dense representation generated by the prediction network and the higher order feature representation generated by the audio encoder.

Implementations of the disclosure may include one or more of the following optional features. In some implementations, the a regularization method is applied to the prediction network during training by recomputing the dense representation using a scaling factor and a stop gradient function having an input tensor with zero gradients. In some examples, the joint network does not include a fully connected layer.

In some implementations, the audio encoder includes a stack of self-attention blocks. In these implementations, the stack of self-attention blocks may include a stack of conformer blocks, or a stack of transformer blocks. In some examples, the stack of conformer blocks includes a stack of 12 encoder blocks having 8-head self-attention.

In some implementations, the prediction network includes a long short-term memory (LSTM)-based prediction network. Alternatively, the prediction network may include a V2 embedding look-up table. In some examples, the prediction network includes a stateless prediction network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
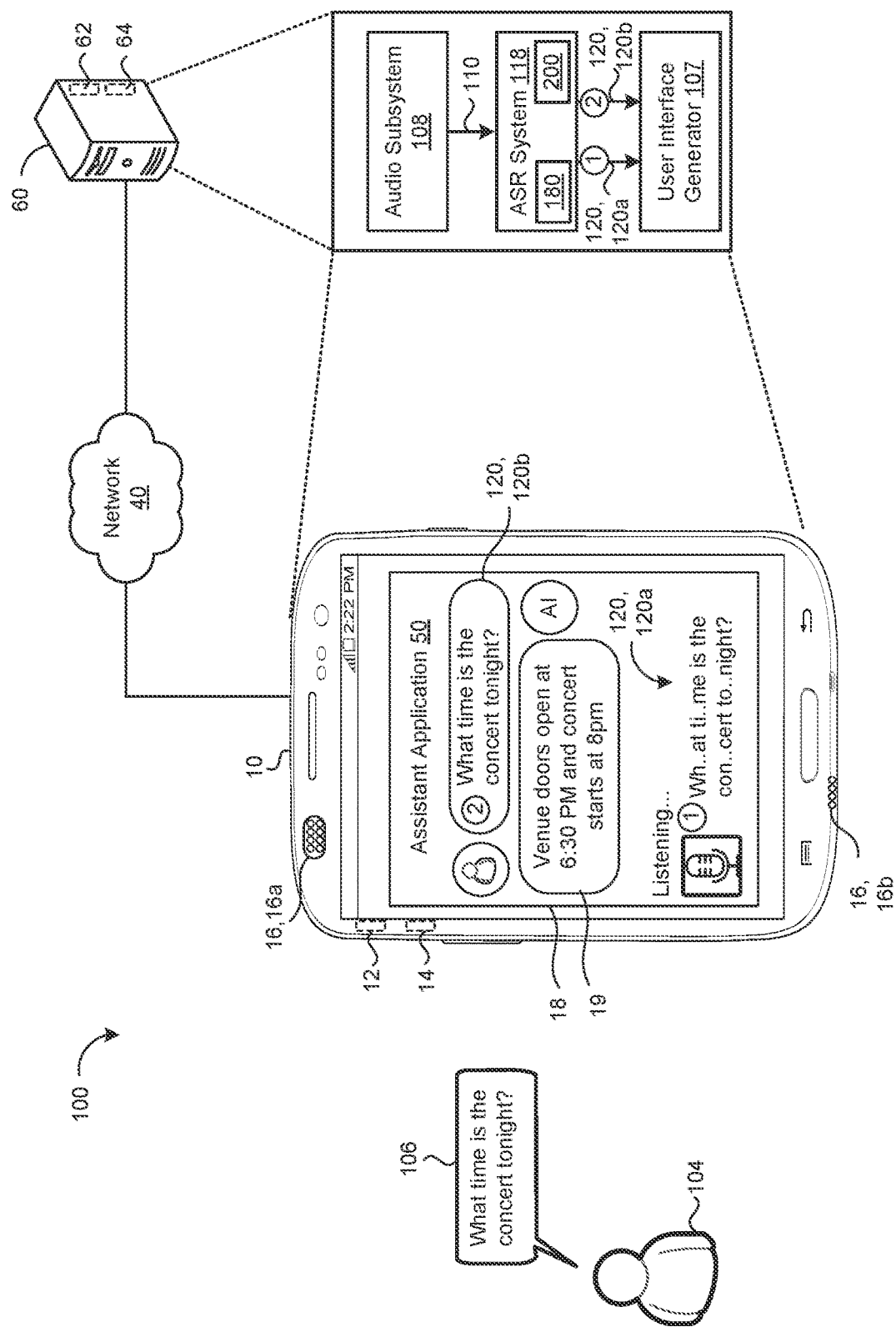
FIG. 1 is a schematic view of an example speech environment using a recurrent neural network-transducer (RNN-T) model for transcribing speech.

A recurrent neural network-transducer (RNN-T) architecture is an end-to-end solution (e.g., a single neural network model) that can be used for streaming automatic speech recognition (ASR) of streaming audio, among other uses. An RNN-T may be part of a speech recognition model or system. To estimate output distributions over word or subword units, an RNN-T includes a joint network to fuse (i) higher order feature representations (also referred to generally as acoustic representations) generated by an audio encoder with (ii) dense representations (also referred to generally as text representations) generated by a prediction network based on previously decoded text using a recurrent structure between the previous and current text in an output text sequence. The audio encoder receives, as input, a sequence of acoustic frames characterizing an input utterance, and generates, at each of a plurality of output steps, the higher order feature representation for a corresponding acoustic frame in the sequence of acoustic frames. The prediction network receives, as input, a sequence of non-blank symbols output by a final Softmax layer of the RNN-T, and generates, at each of the plurality of output steps, a dense representation. The joint network receives, as input, the dense representation generated by the prediction network at each of a plurality of output steps and the higher order feature representation generated by the audio encoder at each of the plurality of output steps, and generates, at each of the plurality of output steps, a probability distribution over possible speech recognition hypotheses. An output layer (e.g., a final Softmax layer) selects, based on the probability distribution, as an output transcription, the candidate transcription or hypothesis having the highest likelihood score of accurately representing the sequence of acoustic frames characterizing the input utterance.

In more particularity, the RNN-T performs ASR by finding the most probable text sequence y given a sequence of acoustic frames $x_{1:T}$. According to Baye's rule, decoding may follow a maximum a posteriori rule to search over each possible hypothesized text sequence y using, for example, the following mathematical expression:

$$P(y|x_{1:T}) \propto p(x_{1:T}|y)P(y) \quad (1)$$

where $P(x_{1:T}|y)$ is estimated by the audio encoder and represents the likelihood that $x_{1:T}$ was spoken given y, and P(y) is estimated by the prediction network using a language model (LM) that represents an underlying probabilistic distribution of the text. RNN-T models $P(y|x_{1:T})$ use a single end-to-end model (e.g., a single neural network). Assuming $y=y_{1:U}$, where U is the number of subword units in y, then for streaming audio data without any look ahead frames or time reduction, a $D^{enc}$ dimensional higher order feature representation $h_t^{enc}$ generated by the audio encoder at time t, a $D^{pred}$ dimensional dense representation $h_u^{pred}$ of the $u^{th}$ subword unit generated by the prediction network, and a $D^{joint}$ dimensional fused representation $h_{t,u}^{joint}$ generated by the joint network can be expressed as follows:

$$h_t^{enc} = \text{AcousticEncoder}(x_{1:t}) \quad (2)$$

$$h_u^{pred} = \text{PredictionNetwork}(y_{1:u-1}) \quad (3)$$

$$h_{t,u}^{joint} = \text{JointNetwork}(h_t^{enc}, h_u^{Pred}) \quad (4)$$

$$P(\hat{y}_i = k | y_{0:u-1}, x_{1:t}) = \text{Softmax}(W^{out} h_{t,u}^{joint})|k \quad (5)$$

where $y_0$ refers to a special start of sentence symbol, and k and $W^{out}$ are, respectively, the $k^{th}$ node and weights of the output layer.

In some examples, the AcousticEncoder in EQN (2) includes a conformer encoder with a fixed number of look ahead frames and a fixed time reduction rate, the PredictionNetwork in EQN (3) includes a multi-layer long short-term memory (LSTM) model, and the JointNetwork in EQN (4) includes a fully connected (FC) layer, where $$h_{t,u}^{joint} = \tan h(W_1^{joint} h_t^{enc} + W_2^{joint} h_u^{pred}) \quad (6)$$

and $W_1^{joint}$ and $W_2^{joint}$ are weight matrices. When $h_t^{enc}$ is ignored in EQN (6), the prediction network, joint network, and output layer jointly form an LSTM language model (LM) that may be referred to as an internal LM. However, studies show fusing the acoustic representations and text representations can improve ASR accuracy.

Gating has been used as a technique in recurrent structures to fuse information. For example, gating has been used in RNN-Ts to fuse acoustic and text representations by allowing each element in a representation vector to be scaled with a different weight before being integrated via, for example, vector addition. This allows, for example, the relative fusing of acoustic and text representations to be adjusted. In more particularity, with gating, the $D^{joint}$ dimensional fused representation $h_{t,u}^{joint}$ generated by the joint network can be expressed mathematically as follows:

$$h_{t,u}^{gate} = g_{t,u}^{gate} \odot \tan h(W_1^{joint} h_t^{enc}) + 1 - g_{t,u}^{gate} \odot \tan h(W_2^{joint} h_u^{pred}) \quad (7)$$

where $g_{t,u}^{gate}$ is a gating vector that can be expressed mathematically as follows:

$$g_{t,u}^{gate} = \sigma(W_1^{gate} h_t^{enc} + W_2^{gate} h_u^{pred}) \quad (8)$$

where $\sigma(\ )$ is a sigmoid function, and $W_1^{gate}$ and $W_2^{gate}$ are weight matrices of the gating layer.

An even more powerful, albeit more computationally expensive, technique of fusing information, such as the acoustic and text representations, is bilinear pooling. Bilinear pooling combines the representation vectors using a bilinear form, which can be expressed as follows:

$$h_{t,u,d}^{joint} = (h_t^{enc})^T W_d^{bi} h_u^{pred} \quad (9)$$

where $W_d^{bi}$ is a $D^{enc} \times D^{pred}$ dimensional matrix, and $h_{t,u,d}^{joint}$ is the $d^{th}$ element of $h_{t,u}^{joint}$. Considering all elements in $h_{t,u}^{joint}$, $[W_1^{bi}, \ldots, W_{D^{joint}}^{bi}]$ is a $D^{enc} \times D^{pred} \times D^{joint}$ dimensional weight tensor, and fusing of $h_t^{enc}$ and $h_t^{pred}$ using bilinear pooling can be mathematically expressed as follows:

$$h_{t,u,d}^{joint} = ([\text{Vector}(W_1^{bi}), \ldots, \text{Vector}(W_{D^{joint}}^{bi})])^T \text{Vector}(h_t^{enc} \otimes h_u^{pred}) \quad (10)$$

where Vector and $\otimes$ refer, respectively, to vectorization and outer product. Compared to gating, bilinear pooling first computes the outer product of the two representation vectors to capture the multiplicative interactions between all possible element pairs in a more expressive $D^{enc} \times D^{pred}$ dimensional space, and then projects that into a $D^{joint}$ dimensional vector space.

Implementations herein are directed toward combining the use of gating and bilinear pooling in the joint network of an RNN-T to balance and improve the fusion of higher order feature representations (also referred to generally as acoustic representations) encoded by the audio encoder from input acoustic frames and dense representations (also referred to generally as text representations). Disclosed herein are novel structures for the joint network of an RNN-T that include gating and bilinear pooling to improve the fusion of acoustic and text representations. By combining gating with bilinear pooling, resultant joint networks leverage the respective strengths and complimentary features of gating and bilinear pooling while fusing the text representation (i.e., dense representation) generated by the prediction network and the acoustic representation (i.e., first higher order feature representation) generated by the audio encoder.

It has been observed that, because text priors are often easier to learn than acoustic features, the prediction network of an RNN-T may converge faster than the audio encoder of the RNN-T. This may result in the joint network of the RNN-T becoming overly reliant on the text representations generated by the prediction network over the acoustic representations generated by the audio encoder when performing ASR on training utterances. For example, the joint network of the RNN-T may overly depend on $h_u^{pred}$ output by the prediction network when computing $h_{t,u}^{joint}$. In such situations, the audio encoder may be less well trained to encode the audio samples that are associated with higher prediction network scores. In order to reduce these training imbalances, prediction network regularization routines may be applied, for example, at the start of training the RNN-T model. Implementations herein are further directed toward using prediction network regularization routines with the joint network having the novel combination structure (e.g., see EQN (11) below) that stacks gating and bilinear pooling to fuse the dense representation generated by the prediction network and the higher order feature representation generated by the encoder network, or with joint networks configured with other structures capable fusing acoustic and text representations (e.g., see EQN (6), EQN (7), EQN (9), or EQN (10)). Example prediction network regularization routines disclosed herein reduce the gradients back-propagated into the prediction network during training in order to optimally balance the fusing of $h_t^{enc}$ and $h_u^{pred}$ by the joint network. For example, during training, the prediction network regularization routines re-compute the dense representation $h_u^{pred}$ using a scaling factor and a stop gradient function having an input tensor with zero gradients.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, vehicle infotainment systems, internet of things (IoT) devices, vehicle infotainment systems, smart displays, smart speakers, etc. The user device 10 includes data processing hardware 12 and memory hardware 14 in communication with the data processing hardware 12. The memory hardware 14 stores instructions that, when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an ASR system 118 implementing an ASR model, such as an RNN-T model 200, and an optional rescorer 180 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the audio data 110 corresponding to the utterance 106, and generates/predicts, as output, a corresponding transcription 120 (e.g., recognition result/hypothesis) of the utterance 106. In the example shown, the RNN-T model 200 may perform streaming speech recognition to produce an initial speech recognition result 120, 120a and the rescorer 180 may update (e.g., rescore) the initial speech recognition result 120a to produce a final speech recognition result 120, 120b. The server 60 includes data processing hardware 62, and memory hardware 64 in communication with the data processing hardware 62. The memory hardware 64 stores instructions that, when executed by the data processing hardware 62, cause the data processing hardware 62 to perform one or more operations, such as those disclosed herein.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition result 120b during time 2. In some configurations, the transcription 120 output from the ASR system 118 is processed, e.g., by a natural language understanding/processing (NLU/NLP) module executing on the user device 10 or the remote computing device 60, to execute a user command or respond to a query specified by the utterance 106. Additionally or alternatively, a text-to-speech system (TTS) (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the RNN-T model 200, while receiving the acoustic frames 110 corresponding to the utterance 106 as the user 104 speaks, encodes the acoustic frames 110 and then decodes the encoded acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen of the user device 10 as soon as they are spoken. In some examples, first look ahead audio context is set equal to zero.

During time 2, the user interface generator 107 presents, via the digital assistant interface 18, a representation of the final speech recognition result 120b of the utterance 106 to the user 104 of the user device 10 rescored by the rescorer 180. In some implementations, the user interface generator 107 replaces the representation of the initial speech recognition results 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, as the final speech recognition result 120b is presumed to be more accurate than the initial speech recognition results 120a, the final speech recognition result 120b that is ultimately displayed as the transcription 120 may fix any terms that may have been misrecognized in the initial speech recognition results 120a. In this example, the streaming initial speech recognition results 120a output by the RNN-T model 200 displayed on the screen of the user device 10 at time 1 are associated with low latency and provide responsiveness to the user 104 that his/her query is being processed, while the final speech recognition result 120b output by the rescorer 180 and displayed on the screen at time 2 leverages an additional speech recognition model and/or a language model to improve the speech recognition quality in terms of accuracy, but at increased latency. However, because the initial speech recognition results 120a are displayed as the user speaks the utterance 106, the higher latency associated with producing, and ultimately displaying the final recognition result 120b is not noticeable to the user 104.

In the example shown in FIG. 1, the digital assistant application 50 may respond to the question posed by the user 104 using natural language processing (NLP). NLP generally refers to a process of interpreting written language (e.g., the initial speech recognition results 120a and/or the final speech recognition result 120b) and determining whether the written language prompts any response or action. In this example, the digital assistant application 50 uses NLP to recognize that the question from the user 104 regards the user's schedule and, more particularly, a concert on the user's schedule. By recognizing these details with NLP, the automated assistant returns a response 19 to the user's question, where the response 19 states, "Venue doors open at 6:30 PM and concert starts at 8 pm." In some configurations, NLP occurs on a remote server 60 in communication with the data processing hardware 12 of the user device 10.

Figure 2:
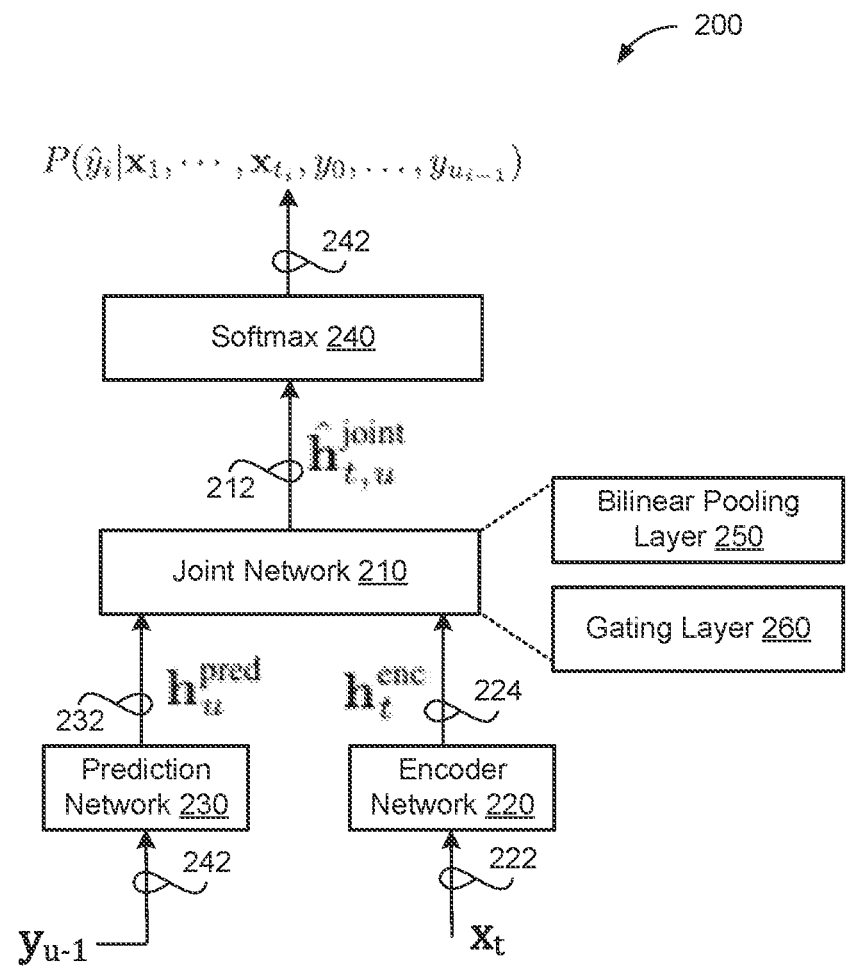
FIG. 2 is a schematic view of an example RNN-T for improving the fusion of acoustic and text representations.

FIG. 2 is a schematic view of an example RNN-T model 200 that fuses higher order feature representations (also referred to generally as acoustic representations) 224 output by the audio encoder network 220 and dense representations (also referred to generally as text representations) 232 output by the prediction network 230. In particular, the RNN-T model 200 includes a novel joint network 210 that combines gating with bilinear pooling to improve the fusion of the acoustic and text representations 224, 232. By combining gating with bilinear pooling, the joint network 210 leverages the respective strengths and complimentary features of gating and bilinear pooling.

As shown, the RNN-T model 200 includes an encoder network 220, a prediction/decoder network 230, the joint network 210, and a final Softmax output layer 240. The encoder network 220 (e.g., an audio encoder), which is roughly analogous to an acoustic model (AM) in a traditional ASR system, receives a sequence of feature vectors (e.g., the acoustic frames 110 of FIG. 1) $x=(x_1, x_2, \ldots, x_t)$ 222, where $x_i \in \mathbb{R}_d$, and produces at each output step a higher-order feature representation (e.g., acoustic representation) 224 denoted as $h_t^{enc}=(h_1^{enc}, \ldots, h_t^{enc})$.

In the example shown, the prediction/decoder network 230 includes an LSTM-based prediction network that, like a language model (LM), processes a sequence of non-blank symbols $y_0, \ldots, y_{u-1}$ 242 output so far by the Softmax layer 240 into a dense representation $h_u^{pred}$ 232, where $y_0$ represents a special start of sequence symbol.

The joint network 210 fuses the representations $h_t^{enc}$ 224 and $h_u^{pred}$ 232 produced, respectively, by the encoder network 220 and the prediction network 230. The joint network 210 generates $P(\hat{y}_i|x_t, y_0, \ldots, y_{u-1})$, which is a distribution over the next candidate output symbol. Stated differently, the joint network 210 generates, at each output step (e.g., time step), a probability distribution over possible speech recognition hypotheses 212. Here, the "possible speech recognition hypotheses" correspond to a set of output labels each representing a word/wordpiece/symbol/character in a specified natural language. For example, when the natural language is English, the set of output labels may include twenty-seven (27) symbols, e.g., one label for each of the 26-letters in the English alphabet and one label designating a space. Accordingly, the joint network 210 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 210 can include a posterior probability value for each of the different output labels. Thus, when there are 100 different output labels representing different graphemes or other symbols, the output $y_i$ of the joint network 210 can include 100 different probability values, one for each output label. The probability distribution can then be used to select and assign scores to candidate orthographic elements (e.g., graphemes, wordpieces, and/or words) in a beam search process (e.g., by the final Softmax output layer 240) for determining the transcription 120.

The joint network 210 includes a novel structure that combines gating with bilinear pooling to improve the fusion of the higher order feature representation $h_t^{enc}$ 224 and the dense representation $h_u^{pred}$ 232 received by the joint network 210 at each of the plurality of output steps when performing speech recognition on an utterance 106 (FIG. 1). In the example shown, the joint network 210 includes a bilinear pooling layer 250 and a gating layer 260. In some examples, the bilinear pooling layer 250 is stacked on top of the gating layer 260. In these examples, the stacking of the bilinear pooling layer 250 and the gating layer 260 can be expressed mathematically as follows:

$$h_{t,u}^{joint} = W^{proj}(\tan h((W_1^{gate})^T h_t^{enc})) \odot (\tan h((W_2^{gate})^T h_{t,u}^{gate})) \quad (11)$$

where $h_{t,u}^{gate}$ refers to the joint representation of EQN (7), and $W_1^{gate}$ and $W_2^{gate}$ are weight matrices of the gating layer 260.

The Softmax layer 240 may employ any technique to select the output label/symbol with the highest probability in the distribution $\hat{h}_{t,u}^{joint}$ 232 as the next output symbol predicted by the RNN-T model 200 at the corresponding output step. In this manner, the RNN-T model 200 does not make a conditional independence assumption. Instead, the prediction of each symbol is conditioned not only on the acoustics but also on the sequence of labels output so far. The RNN-T model 200 does assume an output symbol is independent of future acoustic frames 110, which allows the RNN-T model 200 to be employed in a streaming fashion. In some examples, the Softmax layer 240 is composed of a unified word piece or grapheme set that is generated using all unique word pieces or graphemes in a plurality of training data sets.

In some examples, the feature vectors x 222 include 80-dimensional log-Mel filter bank features formed by stacking three 32 millisecond (ms) acoustic frames with a 10 ms shift to form a 240-dimensional input representation with a 30 ms frame rate, which are then transformed using a first linear projection to a 512-dimensional representation with added positional embeddings. Continuing with this example, the encoder network 220 may include twelve conformer encoder blocks with 8-head self-attention and a convolution kernel size of 15 to further transform the stacked features. Here, the encoder network 220 performs a concatenation operation after the third conformer block to achieve a time reduction rate of two. A fourth conformer block transforms the resulting 1024-dimensional vectors, and then the encoder network 220 projects them back to 512-dimensional using a second linear transform. The remaining eight conformer blocks follow the second linear transformation, followed by a final linear normalization layer to make the dimension $D^{enc}=512$ for the higher order feature representation $h_t^{enc}$ 224. While the encoder network 220 described has a stack of multi-head attention layers/blocks that include conformer layers/blocks (e.g., twelve conformer blocks), the present disclosure is not so limited. For instance, the encoder network 220 may include a stack of transformer layers/blocks or other type of multi-head attention layers/bocks. The encoder network 220 may include a series of multi-headed self-attention, depth-wise convolutional and feed-forward layers. Alternatively, the encoder network 220 may include a plurality of long-short term memory (LSTM) layers in lieu of multi-head attention layers/blocks.

Continuing with the example, the prediction network 230 is an LTSM-based network including two layers of 2,048-dimensional LSTM with a 640-dimensional linear projection to make $D^{pred}=640$ for the dense representation $h_u^{pred}$ 232. The dimension $D^{joint}$ of the fused representation $\hat{h}_{t,u}^{joint}$ 232 is also set to 640. In some examples, the joint network 210 includes hidden units. Additionally or alternatively, the joint network 210 does not include a fully connected (FC) layer.

Alternatively, the encoder network 220 includes a stack of self-attention layers/blocks. Here, the stack of self-attention blocks may include a stack of transformer blocks, or a different stack of conformer blocks.

Alternatively, the prediction network 230 may include a stack of transformer or conformer blocks (or other type of multi-head attention blocks). The prediction network 230 may also be replaced with an embedding look-up table (e.g., a V2 embedding look-up table) to improve latency by outputting looked-up sparse embeddings in lieu of generating dense representations. In some implementations, the prediction network 230 is a stateless prediction network.

As discussed above, the prediction network 230 may converge faster than the encoder network 220 during training, which may result in the joint network 210 becoming overly reliant on the dense representations $h_u^{pred}$ 232 generated by the prediction network 230 over the higher order feature representations $h_t^{enc}$ 224 generated by the encoder network 220 when performing ASR on training utterances. In order to reduce such training imbalances, prediction network regularization routines may be applied, for example, at the beginning of training the RNN-T model 200. More specifically, training of the RNN-T model may include using the prediction network regularization routines together with the joint network having the novel combination structure (e.g., see EQN (11)) that stacks gating and bilinear pooling in order to balance the fusing of the dense representations 232 generated by the prediction network 230 and the higher order feature representations 224 generated by the encoder network 220, or with joint networks configured with other structures capable fusing acoustic and text representations (e.g., see EQN (6), EQN (7), EQN (9), or EQN (10)). In some examples, the prediction network regularization routines reduce the gradients back-propagated into the prediction network 230 during training in order to optimally balance the fusing of $h_t^{enc}$ 224 and $h_u^{pred}$ 232 by the joint network 210. For example, applying the prediction network regularization routines during training may re-compute the dense representation $h_u^{pred}$ 232 using a scaling factor and a stop gradient function having an input tensor with zero gradients. For instance, re-computing the dense representation $h_u^{pred}$ 232 can be expressed as follows:

$$h_u^{pred} = \alpha_m h_u^{pred} - sg((\alpha_m - 1) h_u^{pred}) \quad (12)$$

where m is the index in the current training step, $\alpha_m$ is a scaling factor, and sg( ) is the stop gradient functions whose input tensor will have zero gradients. In this example, when $0 \leq \alpha_m \leq 1$, the value of $h_u^{pred}$ is not changed, but the corresponding gradients that are back-propagated into the prediction network 230 will be reduced by a factor of $\alpha_m$. This slows down the convergence of the prediction network 230, and allows for balancing the fusing of the $h_t^{enc}$ 224 and $h_u^{pred}$ 232 by the joint network 210 during training. In some examples, the prediction network regularization routine selects the value of $\alpha_m$ using a piece-wise linear schedule as follows:

$$\alpha_m = \begin{cases} 0 & \text{if } m < m_1 \\ m/(m_2 - m_1) & \text{else if } m_1 \le m \le m_2, \\ 1 & \text{otherwise} \end{cases} \quad (13)$$

where $m_1$ and $m_2$ are two pre-defined parameters. Notably, applying the prediction network regularization routine is different from initializing the RNN-T model 200 with a pre-trained connectionist temporal classification (CTC) model, even when m=0, because the prediction network 230 provides a random but fix-valued projection through which the RNN-T model 200 is still able to obtain $y_{u-1}$. Compared to other conventional training techniques, training the joint network 210 with the prediction network regularization routine improves the integration of the internal LM during both training and test-time by initially discounting the internal LM during training. Notably, the joint networks 210 and/or prediction network regularization routines are applicable to stateless RNN-T models in which the LM history embedded in the prediction network 230 is limited and/or reset for each utterance.

Figure 3:
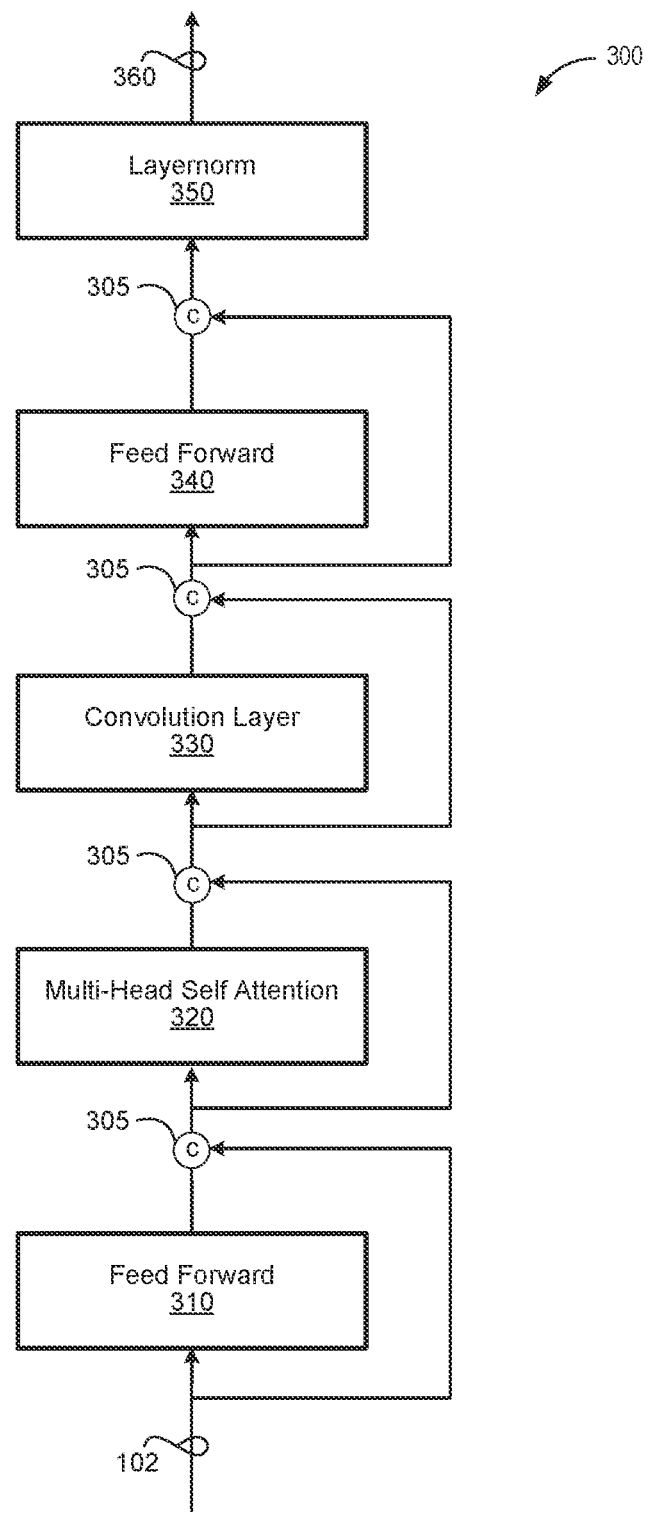
FIG. 3 is a schematic view of an example conformer block.

FIG. 3 is a schematic view of an example conformer block 300 that can be used to implement one of the conformer blocks in the stack of conformer blocks of the encoder network 220 of FIG. 2. The conformer block 300 includes a first half feed-forward layer 310, a second half feed-forward layer 340, with a multi-head self-attention block 320 and a convolution layer 330 disposed between the first and second half feed-forward layers 310, 340, and concatenation operators 305. The first half feed-forward layer 310 processes the input audio data 102 including an input Mel-spectrogram sequence. Subsequently, the multi-head self-attention block 320 receives the input audio data 102 concatenated with the output of the first half-feed forward layer 310. Intuitively, the role of the multi-head self-attention block 320 is to summarize noise context separately for each input frame that is to be enhanced. The convolution layer 330 subsamples the output of the multi-head self-attention block 320 concatenated with the output of the first half feed forward layer 310. Thereafter, the second half-feed forward layer 340 receives a concatenation of the convolution layer 330 output and the multi-head self-attention block 320. A layernorm module 350 processes the output from the second half feed-forward layer 340. The conformer block 300 transforms input features x, using modulation features m, to produce output features y 360, which can, for example, be mathematically expressed as:

$$\hat{x} = x + r(m) \odot x + h(m)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

$$x'' = x' + MHCA(x', n')$$

-continued $$x''' = x' \odot r(x'') + h(x'')$$

$$x'''' = x' + MHCA(x', x''')$$

$$y = LayerNorm\left(x'''' + \frac{1}{2}FFN(x'''')\right).$$

Figure 4:
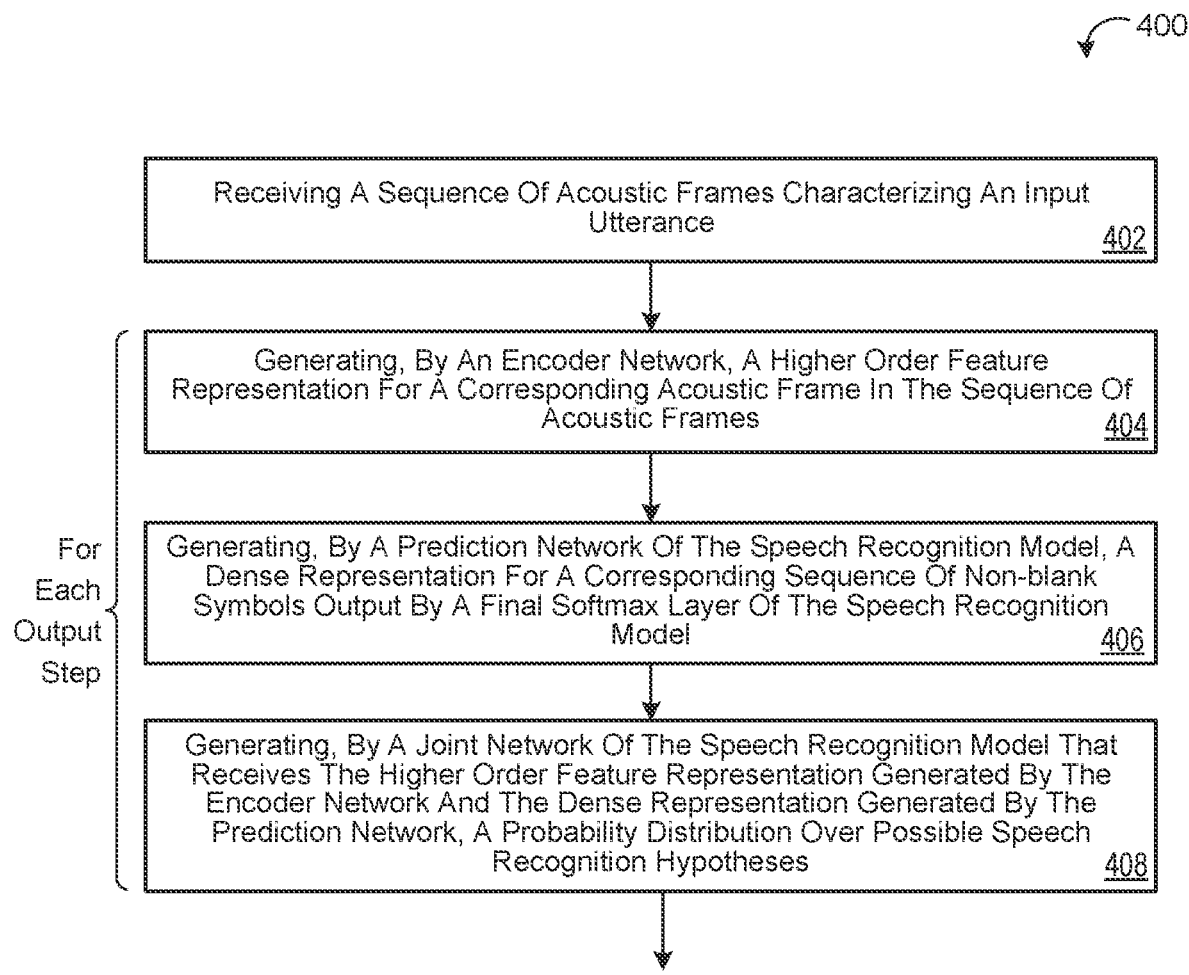
FIG. 4 is a flowchart of an example arrangement of operations for a computer-implemented method of improving the fusion of acoustic and text representations in an RNN-T.

FIG. 4 is a flowchart of an exemplary arrangement of operations for a computer-implemented method 400 of improving the fusion of acoustic and text representations in an RNN-T model, such as the RNN-T model 200. Data processing hardware 510 (e.g., the data processing hardware 12 of the device 10 and/or the data processing hardware 62 of the computing system 60 of FIG. 1) may execute the operations for the method 400 by executing instructions stored on memory hardware 520 (e.g., the memory hardware 14, 64).

At operation 402, the method 400 includes receiving a sequence of acoustic frames $x=(x_1, x_2, \ldots, x_t)$ 222 characterizing an input utterance 106. The method 400 performs operations 404, 406, 408 at each of a plurality of output steps. At operation 404, the method 400 includes generating, by an encoder network 220 of the RNN-T model 200, a higher order feature representation $h_t^{enc}$ 224 for a corresponding acoustic frame 222 in the sequence of acoustic frames 222.

At operation 406, the method 400 includes generating, by a prediction network 230 of the RNN-T model 200, a dense representation $h_u^{pred}$ 232 for a corresponding sequence of non-blank symbols $(y_0, \ldots, y_{u-1})$ 242 output by a final Softmax output layer (e.g., the Softmax layer 240). Here, $y_0$ may represent a special start of sequence symbol.

At operation 408, the method 400 includes generating, by a joint network 210 of the RNN-T model 200 that receives the higher order feature representation $h_t^{enc}$ 224 and the dense representation $h_u^{pred}$ 232 a probability distribution $\hat{h}_{t,u}^{joint}$ 212 over possible speech recognition hypotheses $\hat{y}_u$. For example, the joint network 210 may generate the probability distribution $\hat{h}_{t,u}^{joint}$ 212 using a bilinear pooling layer 250 stacked on a gating layer 260, as discussed above in connection with the joint network 210 of FIG. 2. For example, at operation 408, the method 400 can use EQN (11) to compute the probability distribution $\hat{h}_{t,u}^{joint}$ 212 as output from the joint network 210.

Figure 5:
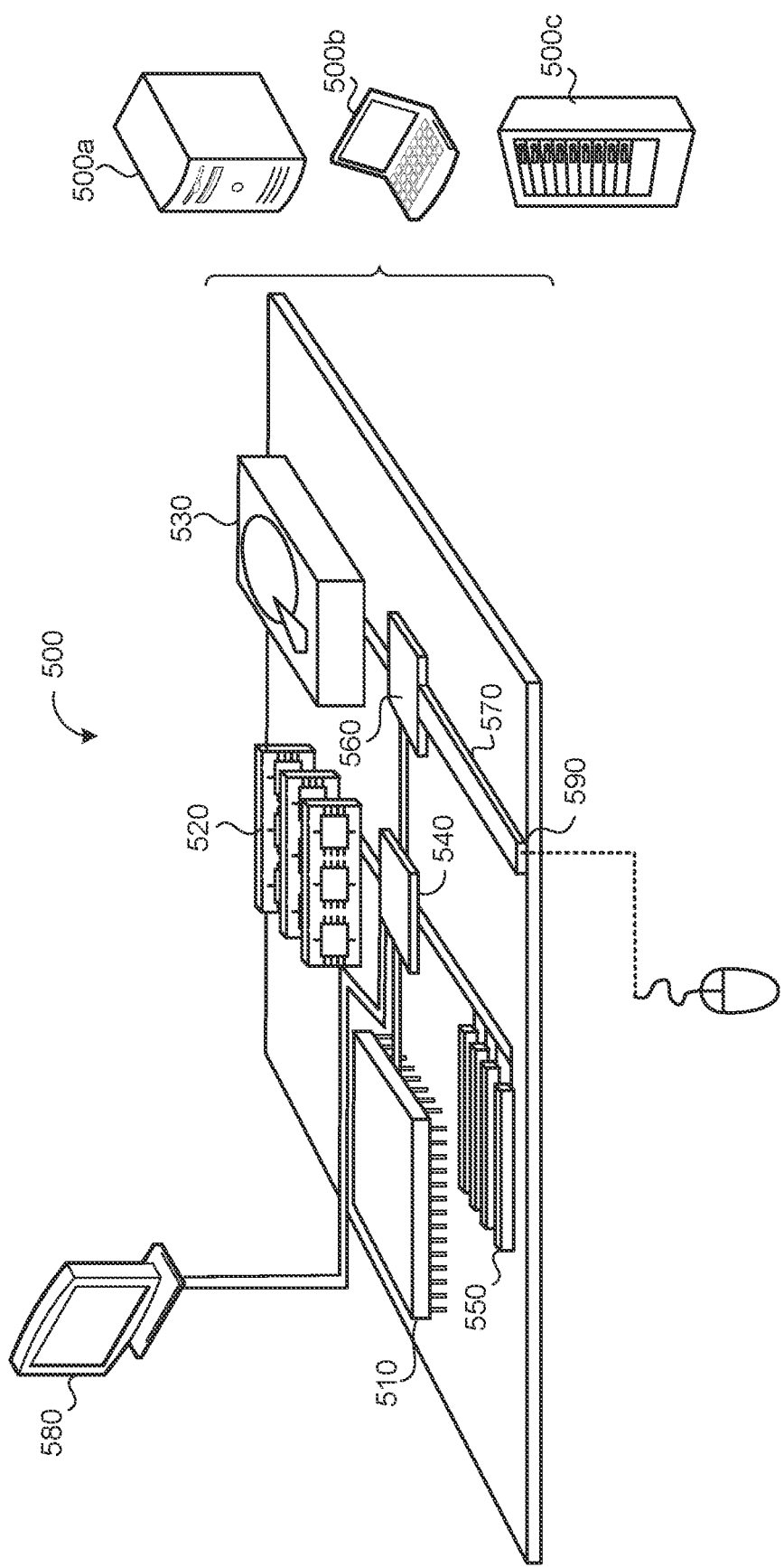
FIG. 5 is a schematic view of an example computing device that can be used to implement the systems and methods described herein.

FIG. 5 is schematic view of an example computing device 500 that can be used to implement the systems and methods described in this document. The computing device 500 is intended to represent various forms of digital computers, such as laptops, desktops, workstations, personal digital assistants, servers, blade servers, mainframes, and other appropriate computer devices. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 12 and/or 62, memory 520 (i.e., memory hardware) that can be used to implement the memory hardware 14 and/or 64, a storage device 530 (i.e., memory hardware) that can be used to implement the memory hardware 14 and/or 64, a high-speed interface/controller 540 connecting to the memory 520 and high-speed expansion ports 550, and a low speed interface/controller 560 connecting to a low speed bus 570 and a storage device 530. Each of the components 510, 520, 530,

540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks, and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. An automated speech recognition (ASR) apparatus comprising an ASR model, the ASR model comprising:
   an encoder network configured to:
      receive, as input, a sequence of acoustic frames characterizing an input utterance; and
      generate, at each of a plurality of output steps, a higher order feature representation for a corresponding acoustic frame in the sequence of acoustic frames; and
   a prediction network configured to:
      receive, as input, a sequence of non-blank symbols output by a final Softmax layer; and
      generate, at each of the plurality of output steps, a dense representation; and
   a joint network configured to:
      receive, as input, the dense representation generated by the prediction network at each of the plurality of output steps and the higher order feature representation generated by the encoder network at each of the plurality of output steps; and
      generate, at each of the plurality of output steps, a probability distribution over possible speech recognition hypotheses,
   wherein the joint network comprises a combination structure that stacks gating and bilinear pooling to fuse the dense representation generated by the prediction network and the higher order feature representation generated by the encoder network.

2. The ASR apparatus of claim 1, wherein a regularization method is applied to the prediction network during training by recomputing the dense representation using a scaling factor and a stop gradient function having an input tensor with zero gradients.

3. The ASR apparatus of claim 1, wherein the joint network does not comprise a fully connected layer.

4. The ASR apparatus of claim 1, wherein the encoder network comprises a stack of self-attention blocks.

5. The ASR apparatus of claim 4, wherein the stack of self-attention blocks comprises a stack of conformer blocks.

6. The ASR apparatus of claim 5, wherein the stack of conformer blocks comprises a stack of 12 encoder blocks having 8-head self-attention.

7. The ASR apparatus of claim 4, wherein the stack of self-attention blocks comprises a stack of transformer blocks.

8. The ASR apparatus of claim 1, wherein the prediction network comprises a long short-term memory (LSTM)-based prediction network.

9. The ASR apparatus of claim 1, wherein the prediction network comprises a V2 embedding look-up table.

10. The ASR apparatus of claim 1, wherein the prediction network comprises a stateless prediction network.

11. A computer-implemented method when executed on data processing hardware causes the data processing hardware to perform operations comprising:
   receiving a sequence of acoustic frames characterizing an input utterance; and
   at each of a plurality of output steps:
      generating, by an encoder network of a speech recognition model, a higher order feature representation for a corresponding acoustic frame in the sequence of acoustic frames;
      generating, by a prediction network of the speech recognition model, a dense representation for a corresponding sequence of non-blank symbols output by a final Softmax layer of the speech recognition model; and
      generating, by a joint network of the speech recognition model that receives the higher order feature representation generated by the encoder network and the dense representation generated by the prediction network, a probability distribution over possible speech recognition hypotheses,
   wherein the joint network comprises a combination structure that stacks gating and bilinear pooling to fuse the dense representation generated by the prediction network and the higher order feature representation generated by the encoder network.

12. The computer-implemented method of claim 11, wherein a regularization method is applied to the prediction network during training by recomputing the higher order feature representation using a scaling factor and a stop gradient function having an input tensor with zero gradients.

13. The computer-implemented method of claim 11, wherein the joint network does not comprise a fully connected layer.

14. The computer-implemented method of claim 11, wherein the encoder network comprises a stack of self-attention blocks.

15. The computer-implemented method of claim 14, wherein the stack of self-attention blocks comprises a stack of conformer blocks.

16. The computer-implemented method of claim 15, wherein the stack of conformer blocks comprises a stack of 12 encoder blocks having 8-head self-attention.

17. The computer-implemented method of claim 14, wherein the stack of self-attention blocks comprises a stack of transformer blocks.

18. The computer-implemented method of claim 11, wherein the prediction network comprises a long short-term memory (LSTM)-based prediction network.

19. The computer-implemented method of claim 11, wherein the prediction network comprises a V2 embedding look-up table.

20. The computer-implemented method of claim 11, wherein the prediction network comprises a stateless prediction network.

* * * * *